US009739249B2

United States Patent
Nakashima et al.

(10) Patent No.: US 9,739,249 B2
(45) Date of Patent: Aug. 22, 2017

(54) AUTOMATIC ENGINE STOPPING/RESTARTING DEVICE, AND AUTOMATIC ENGINE STOPPING/RESTARTING METHOD

(71) Applicants: Masami Nakashima, Hyogo (JP); Takeru Okabe, Tokyo (JP); Osamu Ishikawa, Tokyo (JP); Michitaka Fujiwara, Hyogo (JP)

(72) Inventors: Masami Nakashima, Hyogo (JP); Takeru Okabe, Tokyo (JP); Osamu Ishikawa, Tokyo (JP); Michitaka Fujiwara, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 22 days.

(21) Appl. No.: 14/429,224

(22) PCT Filed: Oct. 12, 2012

(86) PCT No.: PCT/JP2012/076466
§ 371 (c)(1),
(2) Date: Mar. 18, 2015

(87) PCT Pub. No.: WO2014/057576
PCT Pub. Date: Apr. 17, 2014

(65) Prior Publication Data
US 2015/0219060 A1    Aug. 6, 2015

(51) Int. Cl.
*F02N 11/10* (2006.01)
*F02D 17/00* (2006.01)
(Continued)

(52) U.S. Cl.
CPC ............ *F02N 11/101* (2013.01); *F02D 17/00* (2013.01); *F02D 41/009* (2013.01);
(Continued)

(58) Field of Classification Search
CPC ............... F02N 11/101; F02N 11/0844; F02N 11/0814; F02N 11/0818; F02N 2250/04;
(Continued)

(56) References Cited

U.S. PATENT DOCUMENTS 8,171,908 B2 *  5/2012  Senda ................. F02N 11/0844
                                                    123/179.4
8,226,525 B2 *  7/2012  Swales ................. B60W 10/08
                                                    123/179.4
(Continued)

FOREIGN PATENT DOCUMENTS

CN       1878950 A       12/2006
JP      2003-083146 A     3/2003
(Continued)

OTHER PUBLICATIONS

International Search Report for PCT/JP2012/076466 dated Jan. 8, 2013 [PCT/ISA/210].
(Continued)

*Primary Examiner* — Joseph Dallo
(74) *Attorney, Agent, or Firm* — Sughrue Mion, PLLC; Richard C. Turner

(57) ABSTRACT

In order to provide an engine automatic stop and restart apparatus capable of realizing excellent startability, and preventing an excessive load from being imposed on a starter (30) and a power transmission system, a starter drive inhibition determination section (12) inhibits, in a case where an engine restart condition is satisfied, when a backward rotation of an engine (20) is detected based on a crank angle of a crankshaft of the engine (20) detected by a crank angle sensor (1) for detecting the crank angle, a drive of the starter (30) configured to crank the crankshaft so as to restart the engine (20), and releases, when a stop of the engine (20) is detected, the drive inhibition of the starter (30).

4 Claims, 6 Drawing Sheets

(51) Int. Cl.
    *F02N 11/08* (2006.01)
    *F02D 41/00* (2006.01)
    *F02D 41/06* (2006.01)
    *F02D 41/22* (2006.01)
    *F02D 41/30* (2006.01)

(52) U.S. Cl.
    CPC ........... *F02D 41/065* (2013.01); *F02D 41/22* (2013.01); *F02D 41/3005* (2013.01); *F02N 11/0814* (2013.01); *F02N 11/0818* (2013.01); *F02N 11/0844* (2013.01); *F02D 2200/0406* (2013.01); *F02N 2250/04* (2013.01); *Y02T 10/48* (2013.01)

(58) Field of Classification Search
    CPC .... F02D 41/3005; F02D 41/065; F02D 41/22; F02D 41/009; F02D 17/00; F02D 2200/0406; Y02T 10/48
    See application file for complete search history.

(56) References Cited

U.S. PATENT DOCUMENTS

| | | | |
|---|---|---|---|
| 2003/0041847 A1 | 3/2003 | Shin | |
| 2003/0140881 A1* | 7/2003 | Makajima | F02B 61/02 123/179.3 |
| 2007/0084429 A1* | 4/2007 | Taki | F02N 11/0844 123/179.4 |
| 2007/0137602 A1* | 6/2007 | Kassner | F02N 11/0844 123/179.25 |
| 2009/0150048 A1* | 6/2009 | Asada | F02D 37/02 701/103 |
| 2010/0059007 A1* | 3/2010 | Senda | F02N 11/0844 123/179.4 |
| 2011/0053733 A1* | 3/2011 | Swales | B60W 10/08 477/3 |

FOREIGN PATENT DOCUMENTS

| | | |
|---|---|---|
| JP | 4228882 A | 6/2005 |
| JP | 2006-207565 A | 8/2006 |
| JP | 2009-002202 A | 1/2009 |
| JP | 2009-275576 A | 11/2009 |
| WO | 2005045239 A1 | 5/2005 |

OTHER PUBLICATIONS

Written Opinion for PCT/JP2012/076466 dated Jan. 8, 2013 [PCT/ISA/237].

Communication dated Aug. 2, 2016, issued by the State Intellectual Property Office of the P.R.C. in corresponding Chinese Application No. 201280076350.5.

* cited by examiner

AUTOMATIC ENGINE STOPPING/RESTARTING DEVICE, AND AUTOMATIC ENGINE STOPPING/RESTARTING METHOD

TECHNICAL FIELD

The present invention relates to an engine automatic stop and restart apparatus and a method of automatically stopping and restarting an engine, which automatically stop an engine when a predetermined engine automatic stop condition is satisfied, and restart the engine when an engine restart condition is satisfied thereafter.

BACKGROUND ART

Hitherto, an engine automatic stop and restart apparatus has been developed for the purposes of improvement of fuel efficiency of a vehicle such as an automobile and reduction of an environmental load. When predetermined conditions for stopping an engine (for example, an operation of depressing a brake pedal at a vehicle speed equal to or less than a predetermined speed) are satisfied by an operation performed by a driver, the engine automatic stop and restart apparatus automatically performs fuel-cut to automatically stop the engine. Thereafter, when predetermined conditions for restarting the engine (for example, an operation of releasing the brake pedal and an operation of depressing an acceleration pedal) are satisfied by an operation performed by the driver, fuel injection is restarted to automatically restart the engine.

As the engine automatic stop and restart apparatus as described above, there is known an engine automatic stop and restart apparatus for inhibiting, when backward rotation detection estimation means detects or estimates a rotation state of the engine in a backward direction, cranking of the engine by cranking means (starter for the engine) even when a restart condition is satisfied, to thereby prevent an excessive load from being imposed on the starter and a power transmission system (for example, refer to Patent Literature 1).

CITATION LIST

Patent Literature

[PTL 1] JP 4228882 B2

SUMMARY OF INVENTION

Technical Problems

However, the related art has the following problems.

The engine automatic stop and restart apparatus disclosed in Patent Literature 1 estimates that the engine is in the rotation state in the backward direction until a predetermined period has elapsed after the number of revolutions of the engine decreases to be less than a predetermined number of revolutions, and inhibits the cranking of the engine by the starter during this period.

On this occasion, if the cranking of the engine is inhibited until the predetermined period has elapsed after the number of revolutions of the engine decreases to be less than the predetermined number of revolutions, the inhibition state continues for the predetermined period even when an excessive load caused by the cranking is not imposed such as when the engine stops without a backward rotation or a number of revolutions of the backward rotation of the engine is low. Thus, there arises such a problem that the restart delays to degrade the startability.

Moreover, when the engine once stops and the engine then rotates backward after an interval of time, the predetermined period during which the cranking is inhibited may have elapsed. Thus, there arises such a problem that the starter is driven during the backward rotation of the engine to impose an excessive load on the starter and the power transmission system.

The present invention has been made in view of the above-mentioned problems, and therefore has an object to provide an engine automatic stop and restart apparatus and a method of automatically stopping and restarting an engine, which are capable of realizing excellent startability, and preventing an excessive load from being imposed on a starter and a power transmission system.

Solution to Problems

According to one embodiment of the present invention, there is provided an engine automatic stop and restart apparatus for stopping fuel injection into an engine to automatically stop the engine when an engine automatic stop condition is satisfied, and then restarting the engine when an engine restart condition is satisfied, the engine automatic stop and restart apparatus including: a crank angle sensor for detecting a crank angle of a crankshaft of the engine; a starter for cranking the crankshaft, thereby restarting the engine; and a starter drive inhibition determination section for inhibiting, in a case where the engine restart condition is satisfied, a drive of the starter when a backward rotation of the engine is detected based on the crank angle detected by the crank angle sensor, and releasing the drive inhibition of the starter when the stop of the engine is detected.

Further, according to one embodiment of the present invention, there is provided a method of automatically stopping and restarting an engine to be carried out by an engine automatic stop and restart apparatus for stopping fuel injection into an engine to automatically stop the engine when an engine automatic stop condition is satisfied, and then restarting the engine when an engine restart condition is satisfied, the method including the steps of: determining, when the engine restart condition is satisfied, based on a crank angle of a crankshaft of the engine, whether the engine is rotating backward or not; inhibiting, when the engine is determined to be rotating backward, a drive of a starter configured to restart the engine; and releasing, when the stop of the engine is detected, the drive inhibition of the starter.

Advantageous Effects of Invention

In the engine automatic stop and restart apparatus according to one embodiment of the present invention, the starter drive inhibition determination section inhibits, in the case where the engine restart condition is satisfied, when a backward rotation of the engine is detected based on the crank angle of the crankshaft of the engine detected by the crank angle sensor for detecting the crank angle, the drive of the starter configured to crank the crankshaft so as to restart the engine, and releases, when the stop of the engine is detected, the drive inhibition of the starter.

Moreover, the method of automatically stopping and restarting an engine according to one embodiment of the present invention includes the steps of: determining, when the engine restart condition is satisfied, based on the crank angle of the crankshaft of the engine, whether the engine is rotating backward or not; inhibiting, when the engine is determined to be rotating backward, the drive of the starter configured to restart the engine; and releasing, when the stop of the engine is detected, the drive inhibition of the starter.

As a result, excellent startability is realized, and an excessive load is prevented from being imposed on the starter and the power transmission system.

DESCRIPTION OF EMBODIMENT

Figure 1:
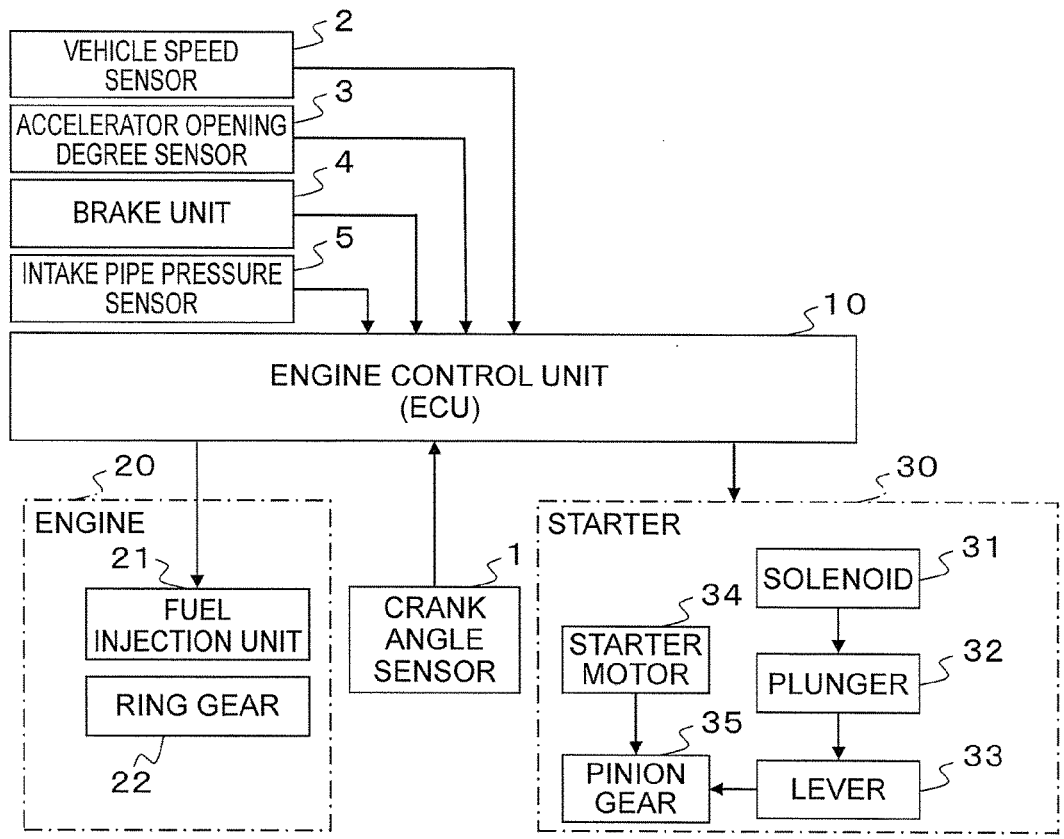
FIG. 1 is a block configuration diagram illustrating an engine automatic stop and restart apparatus according to a first embodiment of the present invention.

In the following, an engine automatic stop and restart apparatus and a method of automatically stopping and restarting an engine according to a preferred embodiment of the present invention are described referring to the accompanying drawings. In the drawings, the same or corresponding parts are denoted by the same reference symbols for description.

First Embodiment

FIG. 1 is a block configuration diagram illustrating an engine automatic stop and restart apparatus according to a first embodiment of the present invention. In FIG. 1, the engine automatic stop and restart apparatus includes an engine control unit (ECU) 10, an engine 20, and a starter 30.

A crank angle sensor 1, a vehicle speed sensor 2, an accelerator opening degree sensor 3, a brake unit 4, an intake pipe pressure sensor 5, the engine 20, and the starter 30 are connected to the engine control unit 10. The engine 20 includes a fuel injection unit 21 and a ring gear 22. The starter 30 includes a solenoid 31, a plunger 32, a lever 33, a starter motor 34, and a pinion gear 35.

The crank angle sensor 1 detects a crank angle of a crankshaft (not shown) of the engine 20 to output a crank angle signal. The vehicle speed sensor 2 detects a speed of a vehicle to output a vehicle speed signal. The accelerator opening degree sensor 3 outputs a voltage signal corresponding to an opening degree of an accelerator pedal. The brake unit 4 outputs a brake signal in response to an operating state of a brake pedal. The intake pipe pressure sensor 5 measures a pressure in an intake pipe and outputs an intake pipe pressure signal.

The engine control unit 10 controls the driving of the fuel injection unit 21 of the engine 20 based on the crank angle signal, the vehicle speed signal, the voltage signal, the brake signal, and the intake pipe pressure signal, and determines whether or not a restart condition is satisfied to control the engine start by the starter 30. The fuel injection unit 21 of the engine 20 supplies a fuel to the engine 20 based on a drive command from the engine control unit 10.

In the starter 30, the solenoid 31 is first energized based on a start command from the engine control unit 10 so that the plunger 32 is pulled. Subsequently, by pulling the plunger 32, the pinion gear 35 is pushed out via the lever 33 in the direction of the rotary shaft to come into contact with and meshing engagement with the ring gear 22 provided on the crankshaft of the engine 20. Thereafter, a contact is closed by the movement of the plunger 32 to energize the starter motor 34. As a result, the pinion gear 35 is rotated.

Note that, the engine control unit 10 includes various I/F circuits (not shown) and a microcomputer (not shown). In addition, the microcomputer includes: an A/D converter (not shown) for converting analog signals from the above-mentioned various sensors into digital signals; a CPU (not shown) for executing various control programs such as an engine automatic stop and restart control program; a ROM (not shown) for storing the engine automatic stop and restart control program, various control programs, control constants, various tables, and the like; and a RAM (not shown) for storing variables and the like when the various control programs are executed.

Figure 2:
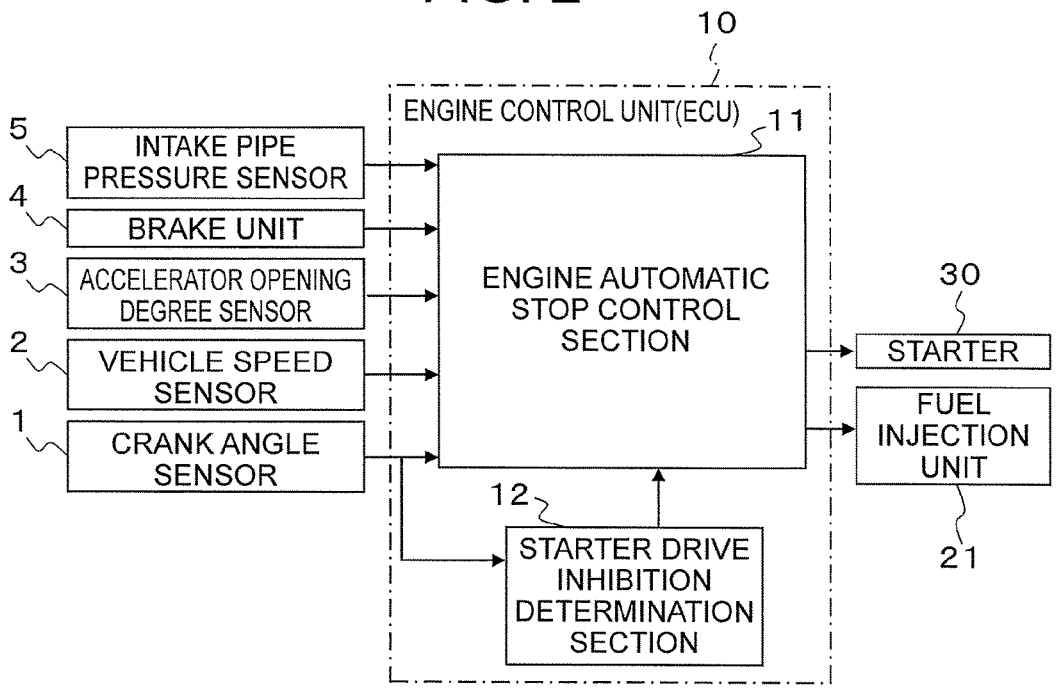
FIG. 2 is a block configuration diagram illustrating in detail an engine control unit of the engine automatic stop and restart apparatus according to the first embodiment of the present invention.

FIG. 2 is a block configuration diagram illustrating in detail the engine control unit 10 of the engine automatic stop and restart apparatus according to the first embodiment of the present invention. In FIG. 2, the engine control unit 10 includes an engine automatic stop control section 11 and a starter drive inhibition determination section 12.

When the engine automatic stop control section 11 first determines that an automatic stop condition for the engine 20 is satisfied based on the vehicle speed signal from the vehicle speed sensor 2, the voltage signal from the accelerator opening degree sensor 3, and the brake signal from the brake unit 4, the engine automatic stop control section 11 stops the fuel injection unit 21. Note that, the engine automatic stop control section 11 represents by an automatic stop flag F1 absence/presence of an automatic stop request based on a determination for the automatic stop of the engine 20.

Then, when the engine automatic stop control section 11 determines that a restart condition for the engine 20 is satisfied based on the voltage signal from the accelerator opening degree sensor 3, and the brake signal from the brake unit 4, the engine automatic stop control section 11 outputs the drive command and the start command respectively to the fuel injection unit 21 and the starter 30, thereby restarting the engine 20.

On this occasion, when the starter 30 is energized, the solenoid 31 is first energized so that the plunger 32 is pulled. Then, the pinion gear 35 is pushed out via the lever 33 in the direction of the rotary shaft to come into contact with and meshing engagement with the ring gear 22 provided on the crankshaft of the engine 20. Then, the contact is closed by the movement of the plunger 32 to energize the starter motor 34, thereby rotating the pinion gear 35.

The starter drive inhibition determination section 12 determines whether to inhibit the drive of the starter 30 or not based on the engine revolution number calculated by using the crank angle signal from the crank angle sensor 1.

Figure 3:
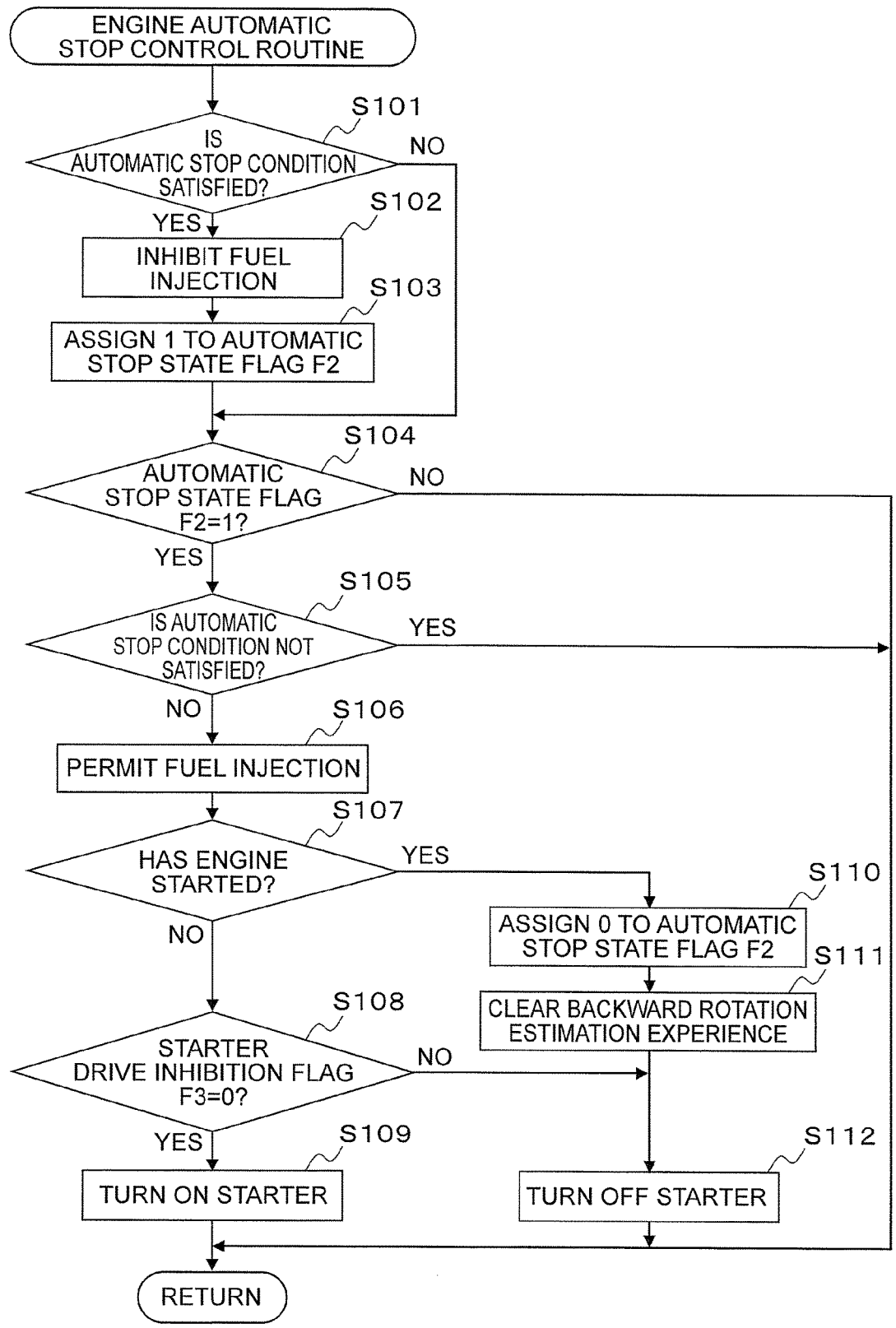
FIG. 3 is a flowchart illustrating an engine automatic stop control routine carried out by an engine automatic stop control section of the engine automatic stop and restart apparatus according to the first embodiment of the present invention.

Referring to a flowchart of FIG. 3, a description is now given of an engine automatic stop control routine carried out by the engine automatic stop control section 11. Note that, the engine automatic stop control routine is repeated at every certain interval such as 1 ms.

In FIG. 3, first, the engine automatic stop control section 11 determines whether or not the automatic stop condition is satisfied, in other words, the automatic stop flag F1=1 (Step S101).

In Step S101, when it is determined that F1=0 and the automatic stop condition is thus not satisfied (that is, No), the engine automatic stop control section 11 proceeds to Step S104 described later.

On the other hand, in Step S101, when it is determined that F1=1 and the automatic stop condition is thus satisfied (that is, Yes), the engine automatic stop control section 11 inhibits the fuel injection (Step S102), and assigns 1 to an automatic stop state flag F2 (Step S103).

Then, the engine automatic stop control section 11 determines whether or not the automatic stop state condition is satisfied, in other words, the automatic stop state flag F2=1 (Step S104).

In Step S104, when it is determined that F2=0 and the automatic stop state is thus not present (that is, No), the engine automatic stop control section 11 finishes the processing of FIG. 3.

On the other hand, in Step S104, when it is determined that F2=1 and the automatic stop state is thus present (that is, Yes), the engine automatic stop control section 11 determines whether or not the automatic stop condition is not satisfied, in other words, the automatic stop flag F1=0 (Step S105).

In Step S105, when it is determined that F1=1 and the automatic stop state is thus present (that is, Yes), the engine automatic stop control section 11 finishes the processing of FIG. 3.

On the other hand, in Step S105, when it is determined that F1=0 and the automatic stop condition is thus not satisfied (that is, No), the engine automatic stop control section 11 permits the fuel injection (Step S106), and determines whether the engine 20 has started or not (Step S107).

On this occasion, whether the engine 20 has started or not is determined depending on whether the engine revolution number has exceeded a predetermined number of revolutions or not. The predetermined number of revolutions is set in advance to 800 rpm, for example, but the set value may vary depending on the engine 20 and a vehicle on which the engine 20 is installed. Moreover, the engine revolution number used for the determination is calculated by the engine control unit 10 based on the crank angle signal from the crank angle sensor 1 illustrated in FIG. 2.

In Step S107, when it is determined that the engine 20 has not started (that is, No), the engine automatic stop control section 11 determines whether or not the starter drive inhibition state is absent, in other words, the starter drive inhibition flag F3=0 (Step S108).

In Step S108, when it is determined that F3=0 and the starter drive inhibition state is thus absent (that is, Yes), the engine automatic stop control section 11 turns on the starter 30 (Step S109), and finishes the processing of FIG. 3.

On the other hand, in Step S107, when it is determined that the engine 20 has started (that is, Yes), the engine automatic stop control section 11 assigns 0 to the automatic stop state flag F2 (Step S110), and clears a backward rotation estimation experience (Step S111). Then, the engine automatic stop control section 11 turns off the starter 30 (Step S112), and finishes the processing of FIG. 3.

On the other hand, in Step S108, when it is determined that F3=1 and the starter drive inhibition state is present (that is, No), the engine automatic stop control section 11 proceeds to Step S112 to turn off the starter 30, and finishes the processing of FIG. 3.

Figure 4:
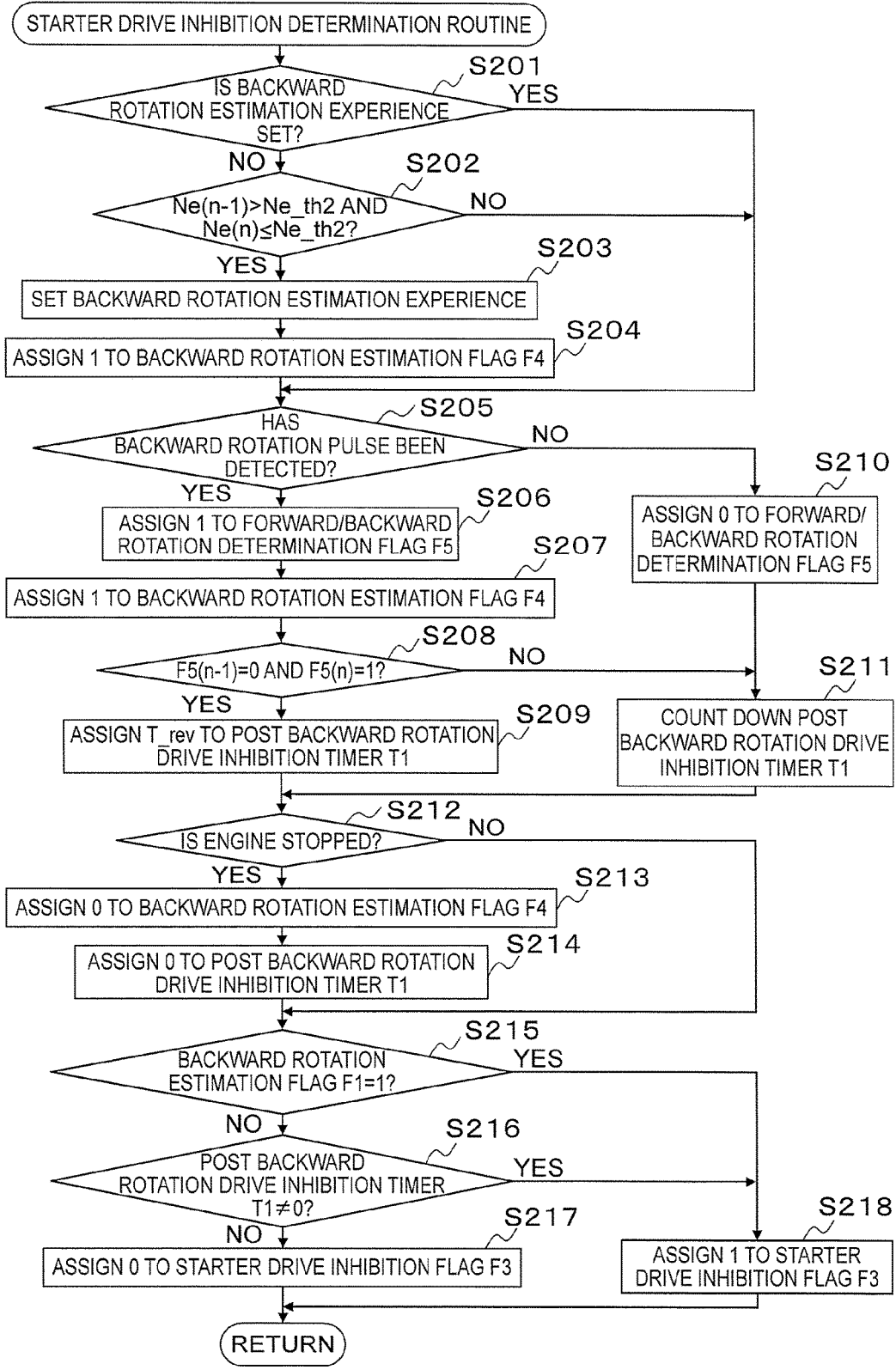
FIG. 4 is a flowchart illustrating a starter drive inhibition determination routine carried out by a starter drive inhibition determination section of the engine automatic stop and restart apparatus according to the first embodiment of the present invention.

Referring to a flowchart of FIG. 4, a description is now given of a drive inhibition determination routine carried out by the starter drive inhibition determination section 12. Note that, the starter drive inhibition determination routine is repeated at every certain interval such as 1 ms.

In FIG. 4, first, the starter drive inhibition determination section 12 determines whether or not the backward rotation estimation experience is set (Step S201).

In Step S201, when it is determined that the backward rotation estimation experience is set (that is, Yes), the starter drive inhibition determination section 12 proceeds to Step S205 described later.

On the other hand, in Step S201, when it is determined that the backward rotation estimation experience is cleared and is thus not set (that is, No), the starter drive inhibition determination section 12 determines whether or not an engine revolution number Ne has fallen below a predetermined value (Step S202).

Specifically, the starter drive inhibition determination section 12 determines whether or not an engine revolution number Ne(n−1) in previous processing is larger than a predetermined value Ne_th2 and an engine revolution number Ne(n) in the current processing is equal to or less than the predetermined value Ne_th2.

On this occasion, the predetermined value Ne_th2 is set to, for example, 30 to 40 rpm in advance. Moreover, the predetermined value Ne_th2 may not be a constant value, and may be set to a value which changes depending on, for example, the crank angle of the engine 20.

In Step S202, when it is determined that the engine revolution number Ne has not fallen below the predetermined value Ne_th2 (that is, No), the starter drive inhibition determination section 12 proceeds to Step S205 described later.

On the other hand, in Step S202, when it is determined that the engine revolution number Ne has fallen below the predetermined value Ne_th2 (that is, Yes), the starter drive inhibition determination section 12 sets the backward rotation estimation experience (Step S203), and assigns 1 to a backward rotation estimation flag F4 (Step S204).

Then, the starter drive inhibition determination section 12 determines whether a backward rotation pulse has been detected or not (Step S205).

In Step S205, when it is determined that the backward rotation pulse has been detected (that is, Yes), the starter drive inhibition determination section 12 assigns 1 to a forward/backward rotation determination flag F5 (Step S206), and assigns 0 to the backward rotation estimation flag F4 (Step S207).

Then, the starter drive inhibition determination section 12 determines whether or not the forward/backward rotation determination flag F5 has been switched from the forward rotation to the backward rotation (Step S208). Specifically, the starter drive inhibition determination section 12 determines whether or not a forward/backward rotation determination flag F5(n−1) in the previous processing is 0, and a forward/backward rotation determination flag F5(n) in the current processing is 1.

In Step S208, when it is determined that the forward/backward rotation determination flag F5 has been switched from the forward rotation to the backward rotation (that is, Yes), the starter drive inhibition determination section 12 assigns a post backward rotation drive inhibition period T_rev to a post backward rotation drive inhibition timer T1 (Step S209).

On this occasion, the post backward rotation drive inhibition period T_rev is a period in which the engine 20 starts the backward rotation and rotates by the minimum value of the backward rotation, and the starter 30 then becomes drivable again, and is a period (T_rev=Tcrk) corresponding to a crank angle at a time point of the start of the engine backward rotation, for example.

Moreover, the post backward rotation drive inhibition period T_rev may be a period (T_rev=Tcrk×Kprs) acquired by multiplying a period Tcrk corresponding to the crank angle at the time point of the start of the engine backward rotation by a post backward rotation drive inhibition period correction value Kprs corresponding to an intake pipe pressure at the time point of the start of the engine backward rotation. Note that, the post backward rotation drive inhibition period T_rev may be set by using a three-dimensional map on which the crank angle and the intake pipe pressure at the time point of the start of the engine backward rotation are respectively represented on the axes.

On the other hand, in Step S205, when it is determined that the backward rotation pulse has not been detected (that is, No), the starter drive inhibition determination section 12 assigns 0 to the forward/backward rotation determination flag F5 (Step S210), counts down the post backward rotation drive inhibition timer T1 (Step S211), and proceeds to Step S212 described later.

On the other hand, in Step S208, also when it is determined that the forward/backward rotation determination flag F5 has not been switched from the forward rotation to the backward rotation (that is, No), the starter drive inhibition determination section 12 proceeds to Step S212.

Then, the starter drive inhibition determination section 12 determines whether the engine 20 is stopped or not (Step S212).

On this occasion, the determination as to whether or not the engine 20 is stopped is made such as when, for example, the crank angle signal is not input from the crank angle sensor 1 for a predetermined period.

In Step S212, when it is determined that the engine 20 is not stopped (that is, No), the starter drive inhibition determination section 12 proceeds to Step S215 described later.

On the other hand, in Step S212, when it is determined that the engine 20 is stopped (that is, Yes), the starter drive inhibition determination section 12 assigns 0 to the backward rotation estimation flag F4 (Step S213), and assigns 0 to the post backward rotation drive inhibition timer T1 (Step S214).

Then, the starter drive inhibition determination section 12 determines whether or not the backward rotation estimation state is present, in other words, the backward rotation estimation flag F4=1 (Step S215).

In Step S215, when it is determined that F4=0 and the backward rotation estimation state is thus not present (that is, No), the starter drive inhibition determination section 12 determines whether or not the value of the post backward rotation drive inhibition timer T1 has a value other than 0 (Step S216). Specifically, the starter drive inhibition determination section 12 determines whether or not the predetermined period has not elapsed after the start of the backward rotation, and the engine 20 is thus rotating backward.

In Step S216, when it is determined that the predetermined period has elapsed after the start of the backward rotation, and the post backward rotation drive inhibition timer T1=0 (that is, No), the starter drive inhibition determination section 12 assigns 0 to the starter drive inhibition flag F3 (Step S217), and finishes the processing of FIG. 4.

On the other hand, when it is determined in Step S215 that F4=1 and the backward rotation estimation state is present (that is, Yes), or, when it is determined in Step S216 that the predetermined period has not elapsed after the start of the backward rotation, and the post backward rotation drive inhibition timer T1≠0 (that is, Yes), the starter drive inhibition determination section 12 assigns 1 to the starter drive inhibition flag F3 (Step S218), and finishes the processing of FIG. 4.

Figure 5:
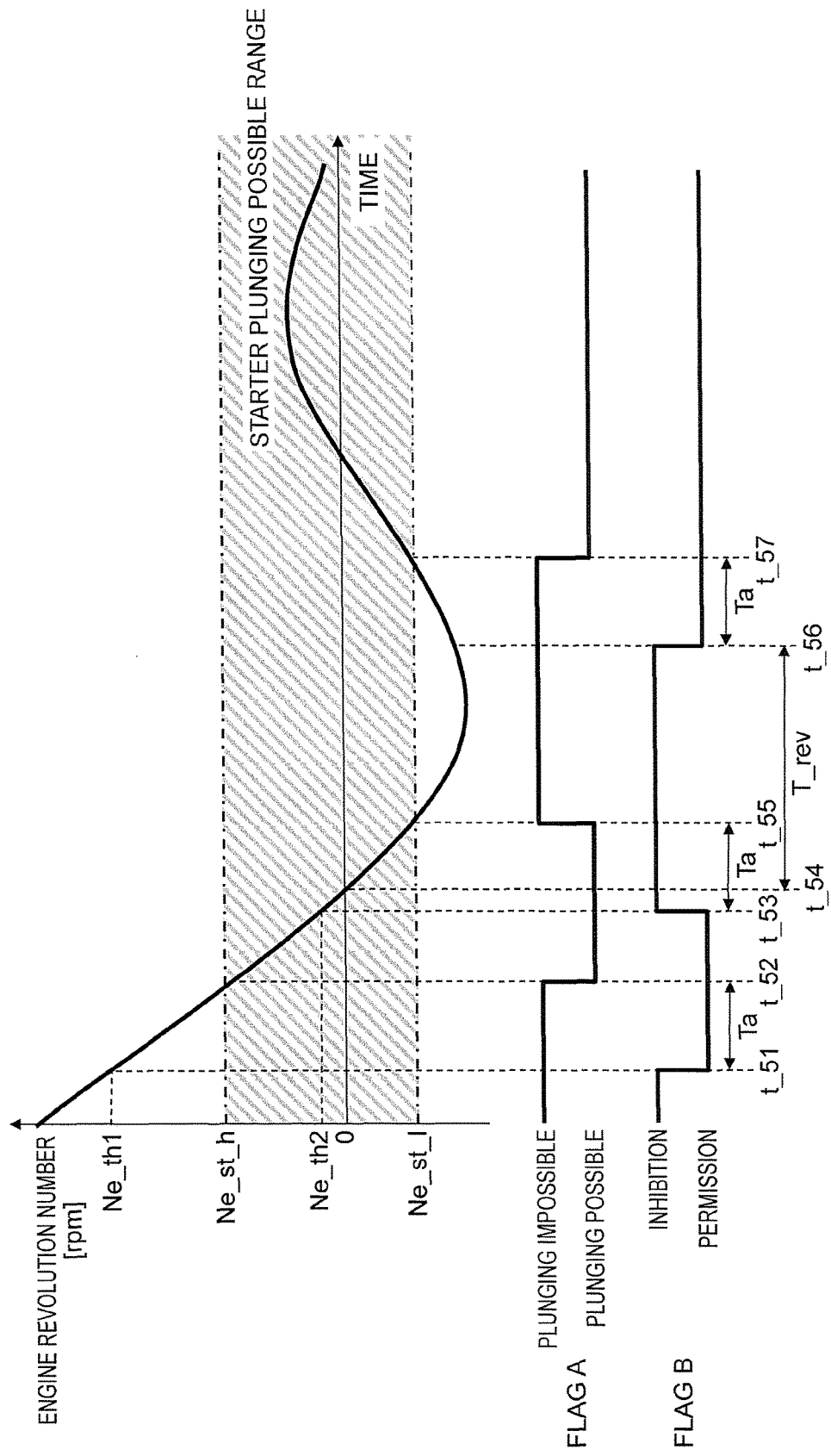
FIG. 5 is a timing chart illustrating a relationship between a decrease behavior of an engine revolution number and a starter plunging possible range in the engine automatic stop and restart apparatus according to the first embodiment of the present invention.

Referring to a timing chart of FIG. 5, a description is now given of a relationship between a decrease behavior of the engine revolution number and a starter plunging possible range in the engine automatic stop and restart apparatus according to the first embodiment of the present invention.

A description is first given of a relationship between the engine revolution number and a flag A of FIG. 5. First, in the plunging type starter, in view of such a configuration that the pinion gear 35 (starter side gear) plunges into the rotating ring gear 22 (engine side gear), there is a revolution number range in which the plunging is possible.

Note that, when the engine revolution number is decreasing, the engine 20 often passes 0 rpm to rotate backward, and is then stopped due to an influence of an inertia of the engine 20. Thus, the gear can plunge in a range (hatched range of FIG. 5) equal to or less than Ne_st_h which is a number of revolutions on an upper limit side of the plunging possible range and equal to or more than Ne_st_l which is a number of revolutions on a lower limit side of the plunging possible range in the stop process of the engine 20.

On this occasion, in general, Ne_st_h, which is the upper limit value of the starter plunging possible range, is, for example, approximately 70 rpm, and Ne_st_l, which is the lower limit value of the starter plunging possible range, is, for example, approximately −50 rpm.

When this range is represented by a flag, the flag behaves as the flag A. The flag A is switched from "plunging impossible" to "plunging possible" at a time point t_52, and is switched from "plunging possible" to "plunging impossible" at a time point t_55. Then, the flag A is again switched from "plunging impossible" to "plunging possible" at a time point t_57.

Moreover, in the plunging type starter, a gap of approximately 3±1 mm exists between the pinion gear 35 and the ring gear 22, and a time difference Ta thus exists between a time point when a starter command signal becomes "drive"

and a time point when the pinion gear 35 and the ring gear 22 come in contact with each other.

Thus, the contact time difference Ta of the starter is approximately 30 to 50 ms in general, but the existence of the time difference Ta shifts the timings of the drive inhibition and the drive permission of the starter leftward by the time Ta with respect to the flag A as represented by a flag B.

Thus, as illustrated in FIG. 5, the flag B is switched from "starter drive inhibition" to "starter drive permission" at a time pint t_51. An engine revolution number Ne_th1 on this occasion is set to a threshold for the starter drive permission determination. Moreover, similarly, the flag B is switched from "starter drive permission" to "starter drive inhibition" at a time point t_53, and an engine revolution number Ne_th2 on this occasion is set to a threshold for the starter drive inhibition determination.

Note that, when the engine 20 starts the backward rotation at a time point t_54, a magnitude of the backward rotation of the engine 20 changes depending on the crank angle and the intake pipe pressure at this time point. A period acquired by subtracting the contact time difference Ta from a period in which the engine starts the backward rotation and rotates by the minimum value, and again enters the starter plunging possible range at a time point t_57 is set to the post backward rotation drive inhibition period T_rev.

Moreover, an actual control program compares the respective determination thresholds Ne_th1 and Ne_th2 with the engine revolution number, and monitors the post backward rotation drive inhibition period T_rev to determine "starter drive inhibition" and "starter drive permission".

Figure 6:
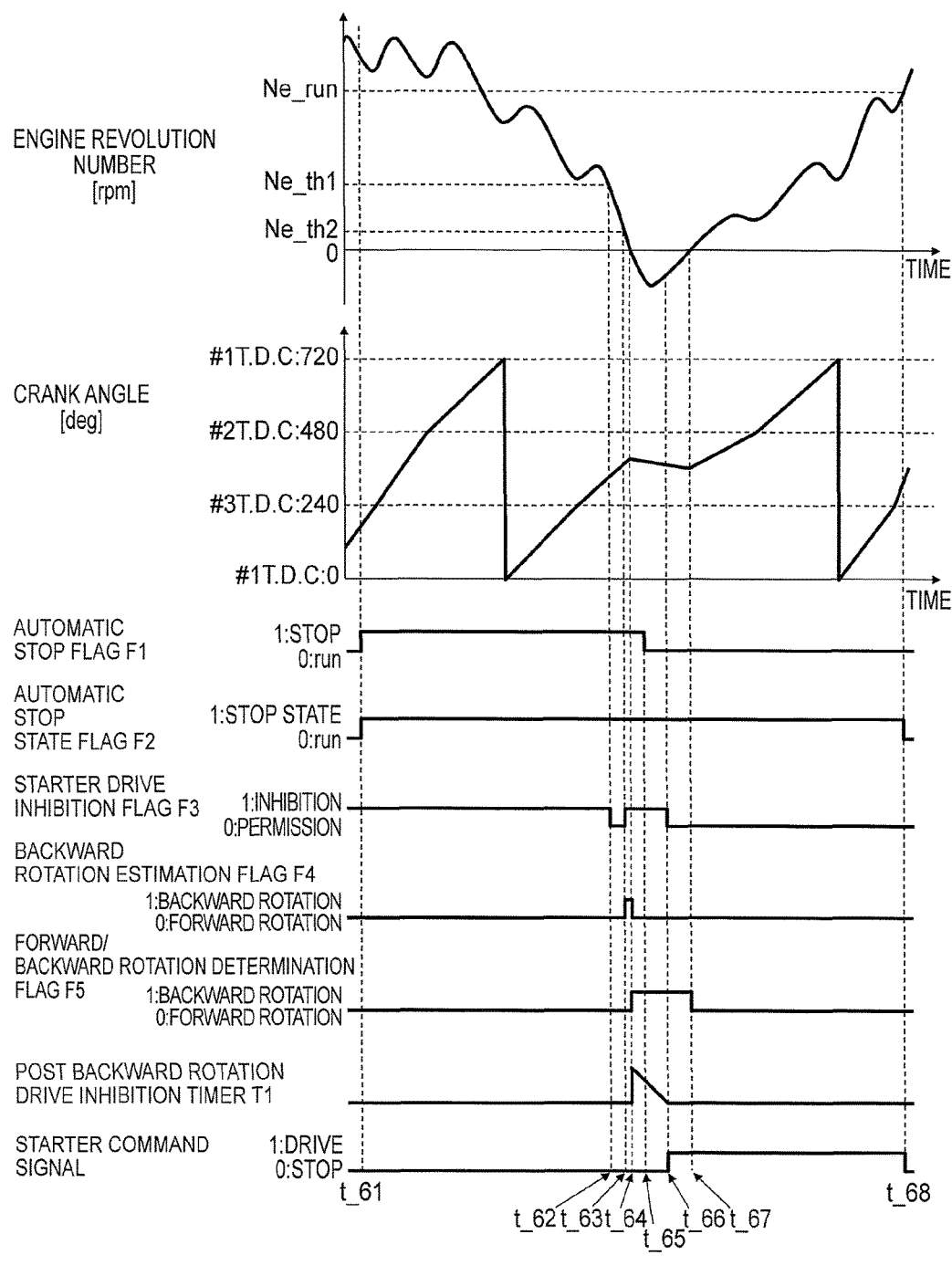
FIG. 6 is a timing chart illustrating behaviors of respective flags and a starter command signal used for control in the engine automatic stop and restart apparatus according to the first embodiment of the present invention.

Referring to a timing chart of FIG. 6, a description is now given of behaviors of the respective flags used for the control in the engine automatic stop and restart apparatus according to the first embodiment of the present invention and the starter command signal. Note that, a description is given of a three-cylinder engine as an example in the first embodiment.

First, as a behavior of the crank angle, the angle increases during the forward rotation of the engine 20, while the angle decreases when the engine 20 rotates backward. In the timing chart of FIG. 6, because the engine 20 starts the backward rotation at a time point t_64, the crank angle turns from an increase to a decrease, and because the engine 20 switches from the backward rotation to the forward rotation at a time point t_67, the crank angle turns from a decrease to an increase.

A description is now given of a behavior of the automatic stop flag F1. When an idling stop determination condition (engine automatic stop condition) such as a depression of the brake pedal is satisfied at a time point t_61, the automatic stop flag F1 is switched to "stop: F1=1".

When this flag is set, the fuel injection is stopped (not shown), and the engine revolution number starts decreasing. Then, when an idling stop release condition (engine restart condition) such as a release of the brake pedal is satisfied at a timing of a time point t_65, the automatic stop flag F1 is switched to "run: F1=0".

A description is now given of a behavior of the automatic stop state flag F2. At the same time when the idling stop determination condition such as the depression of the brake pedal is satisfied at the time point t_61, and the automatic stop flag F1 is switched to "stop: F1=1", the automatic stop state flag F2 is switched to "stopping: F2=1".

Then, the automatic stop state flag F2 is switched to "run: F2=0" at a time point t_68 which is a timing at which the engine 20 is determined to start. When the engine revolution number Ne exceeds a predetermined value (Ne_run), it is determined that the start has completed in the first embodiment.

A description is now given of a behavior of the starter drive inhibition flag F3. The starter drive inhibition flag F3 is a flag set in a case where the drive of the starter 30 is difficult due to a high engine revolution number, for example.

In FIG. 6, a period until a time point t_62 is a region in which the engine revolution number is equal to or more than Ne_th1 described above, and the pinion gear 35 cannot mesh even if the starter 30 is turned on. Thus, the starter drive inhibition flag F3 is set to "inhibition: F3=1". Moreover, a period from the time point t_62 to a time point t_63 is a region in which the pinion gear 35 can mesh, and the starter drive inhibition flag F3 thus is switched to "permission: F3=0".

Then, a period from the time point t_63 to a time point t_64 is a region in which the backward rotation of the engine 20 is estimated to occur, and the pinion gear 35 may thus not mesh. Accordingly, the starter drive inhibition flag F3 is switched to "inhibition: F3=1" in response to a state in which the backward rotation estimation flag F4 described later is "present: F4=1".

Then, a period from the time point t_64 to a time point t_66 is a region in which the backward rotation of the engine 20 occurs, and the pinion gear 35 cannot mesh. Accordingly, the starter drive inhibition flag F3 is maintained in "inhibition: F3=1" in response to a state in which the post backward rotation drive inhibition timer T1 described later is "rotating backward: T1≠0". Moreover, a period after the time point t_66 is a region in which the pinion gear 35 can mesh, and the starter drive inhibition flag F3 is switched to "permission: F3=0".

A description is now given of a behavior of the backward rotation estimation flag F4. The backward rotation estimation flag F4 is a flag that is set when the engine revolution number is decreased so that it is estimated that the pinion gear 35 cannot mesh even if the starter 30 is turned on due to the occurrence of the backward rotation in a period in which the pinion gear 35 comes in contact with the ring gear 22.

In FIG. 6, in a period until the time point t_63, the engine revolution number is equal to or more than Ne_th2 described above, and the backward rotation estimation flag F4 is set to "absent: F4=0". Moreover, during a period from the time point t_63 to the time point t_64, it is determined that the backward rotation may occur, and the backward rotation estimation flag F4 is switched to "present: F4=1". Moreover, after the time point t_64, the backward rotation is detected, and the backward rotation estimation flag F4 is set to "absent: F4=0".

A description is now given of a behavior of the forward/backward rotation determination flag F5. During a period until the time point t_64, the engine 20 is rotating forward, and the forward/backward rotation determination flag F5 is set to "forward rotation: F5=0". Moreover, during a period from the time point t_64 to the time point t_67, the engine 20 is rotating backward, and the forward/backward rotation determination flag F5 is switched to "backward rotation: F5=1". Moreover, after the time point t_67, the engine 20 is rotating forward, and the forward/backward rotation determination flag F5 is switched to "forward rotation: F5=0".

On this occasion, an output from a sensor capable of detecting the backward rotation may be used for the determination whether the engine 20 is rotating forward or backward. Moreover, the period in which the engine 20 is rotating backward may be estimated from a gradient of the engine revolution number Ne or the like.

A description is now given of a behavior of the post backward rotation drive inhibition timer T1. The post backward rotation drive inhibition timer T1 is a timer representing a period (T1≠0) in which it is determined that the pinion gear 35 cannot mesh even if the starter 30 is turned on after the backward rotation of the engine 20 occurs.

In FIG. 6, during the period until the time point t_64, the engine 20 is rotating forward, and the post backward rotation drive inhibition timer T1 is set to "not rotating backward: T1=0". Then, the backward rotation of the engine 20 occurs at the time point t_64, and the predetermined period is thus set, and then, the post backward rotation drive inhibition timer T1 is counted down to 0.

Finally, a description is now given of a behavior of the starter command signal. Setting and clearing of the starter command signal are carried out by the engine automatic stop control routine illustrated in FIG. 3.

In FIG. 6, when the idling stop release condition such as the release of the brake is satisfied at the timing of the time point t_65, the automatic stop flag F1 is switched to "run: F1=0". However, the starter drive inhibition flag F3 is "inhibition: F3=1" on this occasion, and the starter command signal is thus maintained in "stop: 0".

Subsequently, when the starter drive inhibition flag F3 is switched from "inhibition: F3=1" to "permission: F3=0" at the timing of the time point t_66, the starter command signal is switched to "drive: 1", and the cranking is started. Moreover, the engine revolution number Ne exceeds the predetermined value (Ne_run) at the timing of the time point t_68, and it is thus determined that the starting has been completed. Then, the starter command signal is switched to "stop: 0".

Figure 7:
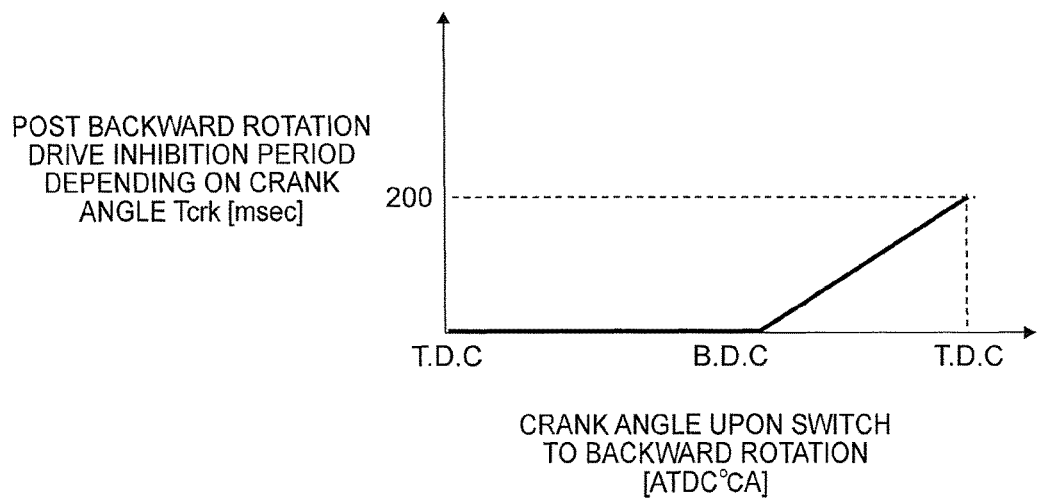
FIG. 7 is a graph showing a relationship between a crank angle and a post backward rotation drive inhibition period when the engine revolution number is switched from a forward rotation to a backward rotation in the engine automatic stop and restart apparatus according to the first embodiment of the present invention.

FIG. 7 is a graph showing a relationship between the crank angle and the post backward rotation drive inhibition period Tcrk when the engine revolution number is switched from the forward rotation to the backward rotation in the engine automatic stop and restart apparatus according to the first embodiment of the present invention.

In FIG. 7, if the crank angle when the engine 20 is switched to the backward rotation is after the top dead center (T.D.C), the post backward rotation drive inhibition period Tcrk does not need to be set. In contrast, as the crank angle approaches the top dead center (T.D.C) after the bottom dead center (B.D.C) with a small degree of the backward rotation, the post backward rotation drive inhibition period Tcrk tends to be longer, in other words, the amount of the backward rotation tends to be higher. On this occasion, this value is set to the period Tcrk corresponding to the crank angle when the engine backward rotation starts, which is applied to the control logic illustrated in the flowchart of FIG. 4.

Figure 8:
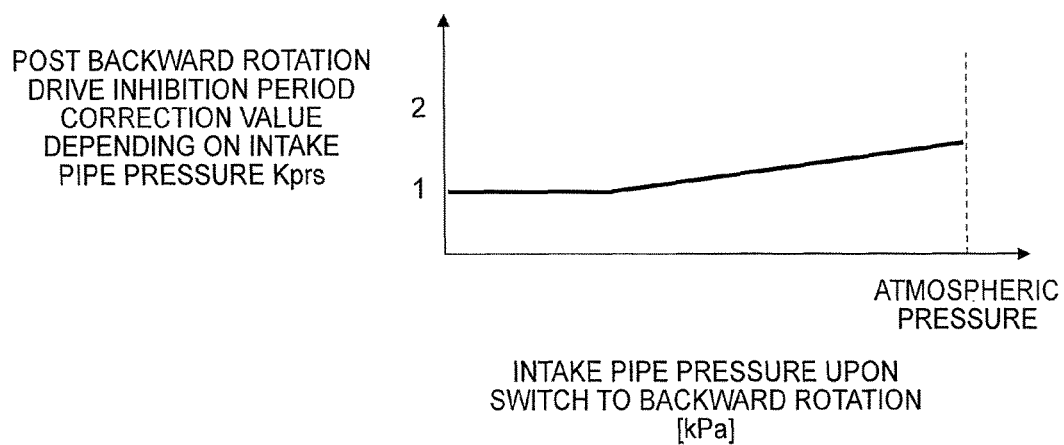
FIG. 8 is a graph showing a relationship between an intake pipe pressure and a post backward rotation drive inhibition period correction value when the engine revolution number is switched from the forward rotation to the backward rotation in the engine automatic stop and restart apparatus according to the first embodiment of the present invention.

FIG. 8 is a graph showing a relationship between the intake pipe pressure and the post backward rotation drive inhibition period correction value Kprs when the engine revolution number is switched from the forward rotation to the backward rotation in the engine automatic stop and restart apparatus according to the first embodiment of the present invention.

In FIG. 8, the amount of the backward rotation tends to be higher as the pressure of the intake air filled in the engine 20 becomes higher for the same crank angle when the engine revolution number is switched from the forward rotation to the backward rotation. On this occasion, this value is the post backward rotation drive inhibition period correction value Kprs applied to the control logic illustrated in the flowchart of FIG. 4.

As described above, according to the first embodiment, the starter drive inhibition determination section inhibits, in the case where the engine restart condition is satisfied, when a backward rotation of the engine is detected based on the crank angle of the crankshaft of the engine detected by the crank angle sensor for detecting the crank angle, the drive of the starter configured to crank the crankshaft so as to restart the engine, and releases, when the stop of the engine is detected, the drive inhibition of the starter.

Moreover, the starter drive inhibition determination section inhibits the drive of the starter when the backward rotation of the engine is detected, and releases the drive inhibition of the starter when the predetermined period has elapsed after the backward rotation of the engine is detected.

As a result, when the drive inhibition of the starter is not necessary, the drive inhibition can be released, and the restart request can be immediately responded to drive the starter. Thus, a period from the restart request to the completion of the start can be reduced, thereby preventing the driver from feeling a sense of discomfort.

Moreover, the starter is prevented from being driven during the backward rotation of the engine, thereby preventing an excessive load from being imposed on the starter and the power transmission system.

In other words, excellent startability is realized, and an excessive load is prevented from being imposed on the starter and the power transmission system.

Further, after the backward rotation of the engine is detected, the starter drive inhibition determination section is configured to set the drive inhibition period of the starter based on the crank angle and the intake pipe pressure when the backward rotation of the engine is detected. Consequently, the optimum drive inhibition period is set.

As a result, a period from the restart request to the completion of the start can be reduced, thereby preventing the driver from feeling a sense of discomfort.

The invention claimed is:

1. An engine automatic stop and restart apparatus for stopping fuel injection into an engine to automatically stop the engine when an engine automatic stop condition is satisfied, and then restarting the engine when an engine restart condition is satisfied, the engine automatic stop and restart apparatus comprising:
   a crank angle sensor for detecting a crank angle of a crankshaft of the engine;
   a starter for cranking the crankshaft, thereby restarting the engine; and
   a starter drive inhibitor that inhibits, in a case where the engine restart condition is satisfied, a drive of the starter when a backward rotation of the engine is detected based on the crank angle detected by the crank angle sensor, and releases the drive inhibition of the starter when the stop of the engine is detected,
   wherein the starter drive inhibitor inhibits the drive of the starter when the backward rotation of the engine is detected, and releases the drive inhibition of the starter when a predetermined period has elapsed after the backward rotation of the engine is detected and the starter drive inhibitor sets the predetermined period based on the crank angle when the backward rotation of the engine is detected.

2. An engine automatic stop and restart apparatus according to claim 1, further comprising an intake pipe pressure sensor for measuring an intake pipe pressure in an intake pipe of the engine, wherein the starter drive inhibitor multiplies the predetermined period by a correction value depending on the intake pipe pressure.

3. An engine automatic stop and restart apparatus according to claim 1, further comprising an intake pipe pressure sensor for measuring an intake pipe pressure in an intake pipe of the engine, wherein the starter drive inhibitor sets the predetermined period from a map based on the crank angle and the intake pipe pressure when the backward rotation of the engine is detected.

4. A method of automatically stopping and restarting an engine to be carried out by an engine automatic stop and restart apparatus for stopping fuel injection into an engine to automatically stop the engine when an engine automatic stop condition is satisfied, and then restarting the engine when an engine restart condition is satisfied, the method comprising:

determining, when the engine restart condition is satisfied, based on a crank angle of a crankshaft of the engine, whether the engine is rotating backward or not;

inhibiting, when the engine is determined to be rotating backward, a drive of a starter configured to restart the engine; and releasing, when the stop of the engine is detected, the drive inhibition of the starter, wherein the drive of the starter is inhibited when the backward rotation of the engine is detected, and the drive inhibition of the starter is released when a predetermined period has elapsed after the backward rotation of the engine is detected, wherein the starter drive inhibitor sets the predetermined period based on the crank angle when the backward rotation of the engine is detected.

* * * * *